United States Patent [19]
Loev

[11] 3,821,386
[45] June 28, 1974

[54] PHARMACEUTICAL COMPOSITIONS AND METHODS OF INHIBITING GASTRIC ACID SECRETION

[75] Inventor: Bernard Loev, Broomall, Pa.

[73] Assignee: Smithkline Corporation, Philadelphia, Pa.

[22] Filed: Apr. 19, 1973

[21] Appl. No.: 352,779

Related U.S. Application Data

[63] Continuation-in-part of Ser. No. 226,531, Feb. 15, 1972, Pat. No. 3,749,728.

[52] U.S. Cl................ 424/263, 424/250, 424/251, 424/258, 424/270, 424/274
[51] Int. Cl.......................................... A61k 27/00
[58] Field of Search.................................. 424/263

[56] References Cited
UNITED STATES PATENTS
3,686,190   8/1972   Malen et al.................. 260/294.8 E

*Primary Examiner*—Albert T. Meyers
*Assistant Examiner*—Frederick E. Waddell
*Attorney, Agent, or Firm*—William H. Edgerton; Joan S. Keps; Richard D. Foggio

[57] ABSTRACT

Pharmaceutical compositions and methods of inhibiting gastric acid secretion by administering N-cycloalkyl and N-cycloalkanealkylthioamides.

10 Claims, No Drawings

PHARMACEUTICAL COMPOSITIONS AND METHODS OF INHIBITING GASTRIC ACID SECRETION

This application is a continuation-in-part of Ser. No. 226,531, filed Feb. 15, 1972, now U.S. Pat. No. 3,749,728.

This invention relates to new N-cycloalkyl and N-cycloalkanealkyl thioamides having pharmacological activity. In particular, these compounds inhibit gastric acid secretion.

The compounds of this invention are represented by the following formula:

FORMULA I

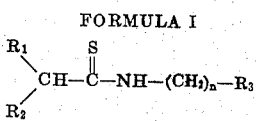

in which:

$R_1$ is a 2-pyridyl, 2-pyrimidyl, 4-pyrimidyl, 2-pyrazinyl, '-pyrrolyl, 2-quinolyl, 2-thiazolyl or 4-thiazolyl ring, said rings being optionally substituted by halogen, lower alkyl or lower alkoxy;

$R_2$ is hydrogen, lower alkyl, lower alkenyl or phenyl, said phenyl being optionally substituted by halogen, lower alkyl or lower alkoxy;

$R_3$ is cycloalkyl having 3 to 6 carbon atoms and n is 0 or 1 and a pharmaceutically acceptable acid addition salt thereof.

Preferred compounds of this invention are represented by Formula I in which $R_2$ is hydrogen or lower alkyl and $R_3$ is cyclopropyl.

Advantageous compounds of this invention are represented by Formula I in which $R_1$ is 2-pyridyl, $R_2$ is hydrogen or lower alkyl and $R_3$ is cyclopropyl.

Particularly advantageous compounds of this invention are N-cyclopropyl-2-(2-pyridyl)thioacetamide and N-cyclopropane-methyl-2-(2-Pyridyl)thioacetamide.

The compounds of this invention produce inhibition of gastric acid secretion. This activity is demonstrated by administration to pylorus ligated rats at doses of about 10 mg./kg. to about 50 mg./kg. orally. Also, this activity is demonstrated by administration to chronic gastric fistula rats (Brodie et al., *Amer. J. Physiol.* 202:812–814, 1962) at doses of about 10 mg./kg. to about 50 mg./kg. orally. In these procedures, compounds which produce an increase in gastric pH or a decrease in the volume of gastric juice or both are considered active.

The compounds of this invention are prepared by the following procedures:

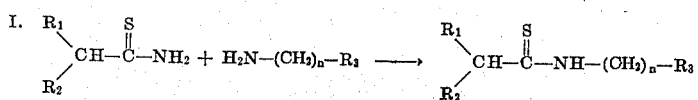

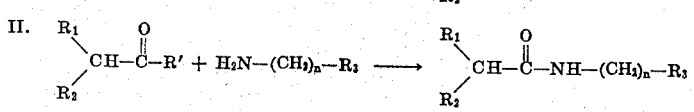

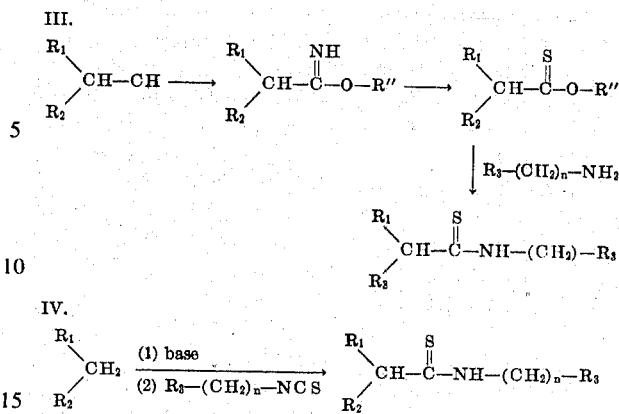

The terms $R_1$, $R_2$, $R_3$ and n are as defined above, $R'$ is methoxy, ethoxy or chloro and $R''$ is methyl or ethyl.

According to procedure I, a substituted thioacetamide is reacted with a cycloalkyl or cycloalkanealkylamine to give the N-cycloalkyl or N-cycloalkanealkyl thioamides. The reaction is preferably carried out at elevated temperature, for example on a steam bath.

According to procedure II, a substituted acetic acid ester or chloride is reacted with a cycloalkyl or cycloalkanealkylamine and the resulting amide is converted to the corresponding thioamide by reacting with phosphorus pentasulfide.

By procedure III, a substituted acetonitrile is reacted with a lower alkanol and acid and the resulting substituted acetimidic acid ester is reacted with hydrogen sulfide to give a substituted thionoacetic acid ester which is then reacted with a cycloalkyl or cycloalkanealkylamine to give the N-substituted thioamides of this invention.

According to procedure IV, a methyl (or substituted methyl) heterocycle is reacted with strong base such as butyl lithium and then with a cycloalkyl or cycloalkanealkyl isothiocyanate to give the N-cycloalkyl and N-cycloalkanealkyl thioamides of this invention.

The pharmaceutically acceptable, acid addition salts of the compounds of Formula I are formed with organic and inorganic acids by methods known to the art. For example, the base is reacted with an organic or inorganic acid in aqueous miscible solvent, such as acetone or ethanol, with isolation of the salt by concentration and cooling or in aqueous immiscible solvent, such as ethyl ether or chloroform, with the desired salt separating directly. Exemplary of the salts which are included in this invention are maleate, fumarate, succinate, oxalate, benzoate, methanesulfonate, ethanedisulfonate, benzenesulfonate, acetate, propionate, tartrate, citrate, hydrochloride, hydrobromide, sulfate, sulfamate, phosphate and nitrate salts.

The compounds of this invention are administered internally either parenterally, rectally or, preferably, orally in an amount to induce the desired biological activity.

Preferably, the compounds are administered in conventional dosage forms prepared by combining an appropriate dose of the compound with standard pharmaceutical carriers.

The pharmaceutical carrier may be for example a solid or a liquid. Exemplary of solid carriers are lactose, magnesium stearate, terra alba, sucrose, talc, stearic acid, gelatin, agar, pectin, acacia or cocoa butter. The amount of solid carrier will vary widely but preferably will be from about 25 mg. to about 1 gm. Exemplary of liquid carriers are syrup, peanut oil, olive oil, sesame oil, propylene glycol, polyethylene glycol (mol. wt. 200–400) and water. The carrier or diluent may include a time delay material well known to the art such as, for example, glyceryl monostearate or glyceryl distearate alone or with a wax.

A wide variety of pharmaceutical forms can be employed, for example the preparation may take the form of tablets, capsules, powders, suppositories, troches, lozenges, syrups, emulsions, sterile injectable liquids or liquid suspensions or solutions.

The pharmaceutical compositions are prepared by conventional techniques involving procedures such as mixing, granulating and compressing or dissolving the ingredients as appropriate to the desired preparation.

The methods of inhibiting gastric acid secretion in accordance with this invention comprise administering internally to an animal an effective amount of a compound of Formula I or a pharmaceutically acceptable acid addition salt thereof. The active ingredient will preferably be administered in dosage unit form as described above.

The compounds of this invention will be administered in a daily dosage regimen of from about 10 mg. to about 2 g., preferably from about 25 mg. to about 1 g. Advantageously, equal doses will be administered one to four times per day. Dosage units will contain from about 10 mg. to about 500 mg., preferably from about 25 mg. to about 250 mg., of the active ingredient.

When the administration is carried out as described above, gastric acid secretion is inhibited.

One skilled in the art will recognize that in determining the amounts of the active ingredient in the claimed compositions and used in the claimed methods, the activity of the chemical ingredient as well as the size of the host animal must be considered.

The terms "lower alkyl" and "lower alkoxy" where used herein denote groups having 1–6, preferably 1–4, carbon atoms; "lower alkenyl" denotes groups having 2–6, preferably 2–4, carbon atoms and "halogen" denotes chloro, bromo or fluoro.

The following examples are not limiting but are illustrative of the compounds of this invention and processes for their preparation.

EXAMPLE 1

A solution of 7.6 g. (0.05 moles) of 2-(2-pyridyl)-thioacetamide in a 40% aqueous solution of cyclopropylamine is refluxed for 45 minutes. After cooling, approximately 30 ml. of water is added. The reaction mixture is extracted three times with chloroform. The extracts are combined and dried over magnesium sulfate. The solvent is removed under reduced pressure. The residue is recrystallized twice from ethyl acetate/hexane to give N-cyclopropyl-2-(2-pyridyl)thioacetamide, m.p. 100°–103° C.

EXAMPLE 2

Cyclopropanemethylamine hydrochloride, 6.02 g. (0.056 moles), and 4.71 g. of sodium bicarbonate (0.056 moles) are dissolved in 75 ml. of water and the solution is added to 4.35 g. (0.029 moles) of 2-(2-pyridyl)thioacetamide. The reaction mixture is heated on a steam bath with stirring for four hours. The mixture is then cooled and 25 ml. of water is added. The reaction mixture is extracted three times with chloroform. The chloroform extracts are combined, dried over magnesium sulfate and then evaporated. The residue is purified by "dry-column" chromatography on silica gel, using ethyl acetate as solvent. The product is recrystallized from ethyl acetate/hexane to give N-cyclopropanemethyl-2-(2-pyridyl)-thioacetamide, m.p. 59°–61° C.

EXAMPLE 3

By the procedure of Example 1, using in place of cyclopropylamine the following cycloalkylamines:

cyclobutylamine cyclopentylamine cyclohexylamine the products are, respectively:
N-cyclobutyl-2-(2-pyridyl)thioacetamide
N-cyclopentyl-2-(2-pyridyl)thioacetamide
N-cyclohexyl-2-(2-pyridyl)thioacetamide.

EXAMPLE 4

By the procedure of Example 2, using in place of cyclopropanemethylamine hydrochloride the following:
cyclobutanemethylamine hydrochloride
cyclopentanemethylamine hydrochloride
cyclohexanemethylamine hydrochloride
the products are, respectively:
N-cyclobutanemethyl-2-(2-pyridyl)thioacetamide
N-cyclopentanemethyl-2-(2-pyridyl)thioacetamide
N-cyclohexanemetnyl-2-(2-pyridyl)thioacetamide.

EXAMPLE 5

By the procedure of Example b 1, using the following thioamides in place of 2-(2-pyridyl)thioacetamide:
2-(2-pyrazinyl)thioacetamide
2-(2-pyrrolyl)thioacetamide
2-(2-quinolyl)thioacetamide
the products are, respectively:
N-cyclopropyl-2-(2-pyrazinyl)thioacetamide
N-cyclopropyl-2-(2-pyrrolyl)thioacetamide
N-cyclopropyl-2-(2-quinolyl)thioacetamide.

EXAMPLE 6

By the procedure of Example 2, using the following thioamides in place of 2-(2-pyridyl)thioacetamide:
2-(2-pyrazinyl)thioacetamide
2-(2-pyrrolyl)thioacetamide
2-(2-quinolyl)thioacetamide
the products are, respectively:
N-cyclopropanemethyl-2-(2-pyrazinyl)thioacetamide
N-cyclopropanemethyl-2-(2-pyrrolyl)thioacetamide
N-cyclopropanemethyl-2-(2-quinolyl)thioacetamide.

EXAMPLE 7

By the procedure of Example 1, using in place of 2-pyridylthioacetamide the following thioamides:
3-methyl-2-(2-pyridyl)thiobutanamide
2-(2-pyridyl)thiopropanamide
2-(2-pyridyl)thiobutanamide
2-(2-pyridyl)thiopenthanamide
2-(2-pyridyl)thiohexanamide
2-(2-pyridyl)thiooctanamide
the products are, respectively:
N-cyclopropyl3-methyl-2-(2pyridyl)thiobutanamide N-cyclopropyl-2-(2-pyridyl)thiopropanamide
N-cyclopropyl-2-(2-pyridyl)thiobutanamide
N-cyclopropyl-2-(2-pyridyl)thiopentanamide
N-cyclopropyl-2-(2-pyridyl)thiohexanamide
N-cyclopropyl-2-(2-pyridyl)thiooctanamide.

EXAMPLE 8

By the procedure of Example 2, using in place of 2-(2-pyridyl)thioacetamide the following thioamides:
3-methyl-2-(2-pyridyl)thiobutanamide
2-(2-pyridyl)thiopropanamide
2-(2-pyridyl)thiobutanamide
2-(2-pyridyl)thiopentanamide
2-(2-pyridyl)thiohexanamide
2-(2-pyridyl)thiooctanamide
the products are, respectively:
N-cyclopropanemethyl-3-methyl-2-(2-pyridyl)thiobutanamide
N-cyclopropanemethyl-2-(2-pyridyl)thiopropanamide
N-cyclopropanemethyl-2-(2-pyridyl)thiobutanamide
N-cyclopropanemethyl-2-(2-pyridyl)thiopentanamide
N-cyclopropanemethyl-2-(2-pyridyl)thiohexanamide
N-cyclopropanemethyl-2-(2-pyridyl)thiooctanamide.

EXAMPLE 9

By the procedure of Example 1, using 2-(2-pyridyl)-4-thiopentenamide in place of 2-(2-pyridyl)thioacetamide the product is N-cyclopropyl-2-(2-pyridyl)-4-thiopentamide.

Using 2-(2-pyridyl)-4-thiopentenamide in place of 2-(2-pyridyl)thioacetamide in the procedure of Example 2, the product is N-cyclopropanemethyl-2-(2-pyridyl)-4-thiopentenamide.

EXAMPLE 10

Methyl 4-thiazolyl Ketone (12.7 g.) is added to 3.8 g. of sodium borohydride in 100 ml. of isopropanol and the mixture is heated at reflux for four hours. Dilute hydrochloric acid (100 ml.) is added and the mixture is evaporated to dryness. The residue is dissolved in a small volume of water and the aqueous solution is made basic with 5% aqueous sodium bicarbonate solution, then evaporated to dryness. The residue is extracted with ether and the ether is removed from the extract in vacuo to give α-(4-thiazolyl)-ethanol.

A mixture of 8.4 g. of α-(4-thiazolyl)ethanol and 25 ml. of thionyl chloride is heated for four hours on a steam bath, then concentrated in vacuo. The residue is dissolved in water and basified with 5% aqueous sodium carbonate solution. Extracting with ether, then drying and concentrating the extracts gives 4-(α-chloroethyl)thiazole.

A solution of 7.8 g. of 4-(α-chloroethyl)thiazole is added dropwise to a suspension of 5.2 g. of sodium cyanide in 100 ml. of dimethylsulfoxide. The mixture is heated at 50° C. for two hours, then diluted with 150 ml. of a 5% aqueous sodium carbonate solution and extracted with ether. The extract is dried and concentrated to give α-(4-thiazolyl)propionitrile.

To 12.4 g. of α-4-thiazolyl)propionitrile in 13 ml. of pyridine is added 5 ml. of triethylamine. Hydrogen sulfide is bubbled into the mixture for two hours. The mixture is heated in a sealed tube at 100° C. for 15 hours, then cooled and concentrated to dryness. The residue is extracted with chloroform and the extract is concentrated to dryness. The residue is recrystallized from chloroform-hexane to give 2-4-thiazolyl)thiopropanamide.

Using 2-(1-thiazolyl)thiopropanamide in place of 2-(2-pyridyl)thioacetamide in the procedure of Example 1, the product is N-cyclopropyl-2-(4-thiazolyl)thiopropanamide.

By the procedure of Example 2, using 2-(4-thiazolyl)-thiopropanamide in place of 2-(2-pyridyl)thioacetamide, the product is N-cyclopropanemethyl-2-(4-thiazolyl)thiopropanamide.

EXAMPLE 11

Alternatively, N-cyclopentyl-2-(2-pyridyl)thioacetamide is prepared by the following procedure.

Dry hydrogen chloride is bubbled through a solution 1.4 ml. of absolute ethanol and 2.4 g. of 2-(2-pyridyl)-acetonitrile in 25 ml. of dry methylene chloride for 20 minutes. The reaction mixture is then cooled and dry ether is added with stirring. The precipitate is filtered off and washed with dry ether to give ethyl 2-(2-pyridyl)acetimidate hydrochloride.

Hydrogen sulfide is bubbled through a solution of the above prepared ethyl 2-(2-pyridyl)acetimidate hydrochloride in 20 ml. of pyridine and 2 ml. of triethylamine for one hour. The reaction mixture is stirred for another hour at room temperature. The triethylamine hydrochloride is filtered off and the filtrate is concentrated, then taken up in benzene and filtered. The filtrate is concentrated to give ethyl 2-(2-pyridyl)thionoacetate.

A solution of the above prepared thionoacetate and 1.8 g. of cyclopentylamine is stirred over an oil bath at 90°–100° C for 45 minutes. The reaction mixture is cooled, then taken up in chloroform and washed three times with water. The chloroform solution is concentrated and chromatographed on a silica gel "dry-column" eluting with 2:1 methanol-acetonitrile to give N-cyclopentyl-2-(2-pyridyl)thioacetamide.

EXAMPLE 12

Alternatively, N-cyclopropanemethyl-2-(2-pyridyl)-thiopropanamide is prepared by the following procedure.

A solution of 10.7 g. (0.1 mole) of 2-ethylpyridine in 50 ml. of anhydrous benzene is added dropwise at 25° C. to 8.7 g. (0.1 mole) of phenyl lithium in 100 ml. of anhydrous benzene. After the addition, the reaction is stirred for 30 minutes and 11.3 g. (0.1 mole) of cyclopropanemethyl isothiocyanate in 50 ml. of anhydrous benezene is added dropwise. The mixture is stirred at 25° C. for 15 hours, then decomposed with dilute hydrochloric acid. The layers are separated and the aqueous layer is basified with aqueous sodium carbonate solution. Extraction with ether, removal of the ether from the extract and recrystallization of the residue from isopropyl ether gives N-cyclopropanemethyl-2-(2-pyridyl)thiopropanamide.

EXAMPLE 13

To a solution of 22.2 g. of methyl magnesium chloride in ether is added 10.5 g. of 4-pyrimidinecarbonitrile in tetrahydrofuran. The resulting mixture is heated at reflux for 24 hours, then poured onto ice. To the mixture is added 75 ml. of 25 % sulfuric acid. The solution is then made basic with 10 % aqueous sodium carbonate solution and extracted with ether. The extracts are dried and concentrated to give methyl 4-pyrimidyl ketone.

By the procedure of Example 10, using methyl 4-pyrimidyl ketone in place of methyl 4-thiazolyl ketone, 2-(4-pyrimidyl)thiopropanamide is obtained.

Using 2-(4-pyrimidyl)thiopropanamide in place of 2-(2-pyridyl)thioacetamide in the procedure of Example 1 gives N-cyclopropyl-2-(4-pyrimidyl)thiopropanamide.

By the procedure of Example 2, using 2-(4-pyrimidyl)-thiopropanamide in place of 2-(2-pyridyl)thioacetamide, the product is N-cyclopropanemethyl-2-(4-pyrimidyl)thiopropanamide.

EXAMPLE 14

By the procedure of Example 13, using 2-(4-chloropyridine)carbonitrile as the starting material, 2-(4-chloro-2-pyridyl)thiopropanamide is obtained.

Using 2-(4-chloro-2-pyridyl)thiopropanamide in place of 2-(2-pyridyl)thioacetamide in the procedures of Examples 1 and 2, the products are N-cyclopropyl-2-(4-chloro-2-pyridyl)thiopropanamide and N-cyclopropanemethyl-2-(4-chloro-2-pyridyl)thiopropanamide, respectively.

EXAMPLE 15

A solution of 11.8 g. of 2-pyridylacetonitrile in 30 ml. of dimethylsulfoxide is added to a suspension of 2.4 g. of sodium hydride in 50 ml. of dimethylsulfoxide with stirring. The mixture is heated on a steam bath for two hours, then cooled to room temperature. 2-Methyl-2-pentenyl-1-chloride (11.8 g.) is added dropwise with stirring. The mixture is heated on a steam bath, with stirring, for 10 hours, then most of the solvent is removed in vacuo. Water is added to the residue, then 200 ml. of ether is added. The ethereal solution is separated from the aqueous layer and rinsed several times with water, then dried, concentrated and distilled to give 4-methyl-2-(2-pyridyl)-4-heptenenitrile.

Treating the above prepared nitrile with hydrogen sulfide by the procedure described in Example 10 gives 4-methyl-2-(2-pyridyl)-4-thioheptenamide.

Reacting 4-methyl-2-(2-pyridyl)-4-thioheptenamide with cyclopentylamine by the procedure of Example 1 gives N-cyclopentyl-4-methyl-2-(2-pyridyl)-4-thioheptenamide.

EXAMPLE 16

By the procedure described in Example 10, α-(6-methyl-2-pyridyl)-2-propenol is treated with thionyl chloride, the resulting 2-(1-chloro-2-propenyl)-6-methylpyridine is reacted with sodium cyanide and the resulting 2-(6-methyl-2-pyridyl)-3-butenenitrile is treated with hydrogen sulfide to give 2-(6-methyl-2-pyridyl)-3-thiobutenamide.

Using 2-(6-methyl-2-pyridyl)-3-thiobutenamide in place of 2-(2-pyridyl)thioacetamide in the procedure of Example 2 gives N-cyclopropanemethyl-2-(6-2-pyridyl)-3-thiobutenamide.

EXAMPLE 17

By the procedure of Example 1, using the following 2-(substituted 2-pyridyl)thioacetamides in place of 2-(2-pyridyl)thioacetamide:
  2-(6-methyl-2-pyridyl)thioacetamide
  2-(5-methyl-2-pyridyl)thioacetamide
  2-(4-methyl-2-pyridyl)thioacetamide
  2-(3-methyl-2-pyridyl)thioacetamide
  2-(5-ethyl-2-pyridyl)thioacetamide
  2-(4-methoxy-2-pyridyl)thioacetamide
  2-(4-ethoxy-2-pyridyl)thioacetamide
the products are, respectively:
  N-cyclopropyl-2-(6-methyl-2-pyridyl)thioacetamide
  N-cyclopropyl-2-(5-methyl-2-pyridyl)thioacetamide
  N-cyclopropyl-2-(4-methyl-2-pyridyl)thioacetamide
  N-cyclopropyl-2-(3-methyl-2-pyridyl)thioacetamide
  N-cyclopropyl-2-(5-ethyl-2-pyridyl)thioacetamide
  N-cyclopropyl-2-(4-methoxy-2-pyridyl)thioacetamide
  N-cyclopropyl-2-(4-ethoxy-2-pyridyl)thioacetamide.

Using the above 2-(substituted-2-pyridyl)thioacetamides in place of 2-(2-pyridyl)thioacetamide in the procedure of Example 2 gives the corresponding N-cyclopropanemethyl compounds.

EXAMPLE 18

By the procedure of Example 1, using in place of 2-(2-pyridyl)thioacetamide the following thioacetamides as starting materials:
  2-phenyl-2-(2-pyridyl)thioacetamide
  2-(4-chlorophenyl)-2-(2-pyridyl)thioacetamide
  2-(2-fluorophenyl)-2-(2-pyridyl)thioacetamide
  2-(3-methylphenyl)-2-(2-pyridyl)thioacetamide
  2-(4-methoxyphenyl)-2-(2-pyridyl)thioacetamide
  2-phenyl-2-(2-pyrazinyl)thioacetamide
  2-(4-chlorophenyl)-2-(2-pyrimidyl)thioacetamide
  2-phenyl-2-(2-thiazolyl)thioacetamide
the products are, respectively:
  N-cyclopropyl-2-phenyl-2-(2-pyridyl)thioacetamide
  2-(4-chlorophenyl)-N-cyclopropyl-2-(2-pyridyl)thioacetamide
  N-cyclopropyl-2-(2-fluorophenyl)-2-(2-pyridyl)thioacetamide
  N-cyclopropyl-2-(3-methylphenyl)-2-(2-pyridyl)thioacetamide
  N-cyclopropyl-2-(4-methoxyphenyl)-2-(2-pyridyl)thioacetamide
  N-cyclopropyl-2-phenyl-2-(2-pyrazinyl)thioacetamide 2-(4-chlorophenyl)-N-cyclopropyl-2-(2-pyrimidyl)thioacetamide N-cyclopropyl-2-phenyl-2-(2-thiazolyl)thioacetamide.

Using the above thioacetamide starting materials in the procedure of Example 2, the corresponding N-cyclopropanemethyl compounds are obtained.

EXAMPLE 19

Alternatively, N-cyclopropyl-2-(2-pyridyl)thioacetamide is prepared by the following procedure.

A mixture of 6 g. of cyclopropylamine, 16 g. of ethyl 2-(2-pyridyl)acetate and 50 ml. of ethanol is stirred at room temperature for three days. Volatile materials are then removed and the residue is distilled to give N-cyclopropyl-2-(2-pyridyl)acetamide.

To 1.9 g. of N-cyclopropyl-2-(2-pyridyl)acetamide in 25 ml. of pyridine is added 2.2 g. of phosphorus pentasulfide. The resulting mixture is heated on a steam bath for two hours, then 25 ml. of water is added. The mixture is extracted with chloroform and the extracts are dried and concentrated and the residue is recrystallized from isopropyl ether to give N-cyclopropyl-2-(2-pyridyl)thioacetamide.

EXAMPLE 20

By the procedure of Example 10, 2-(chloromethyl)-thiazole is reacted with sodium cyanide to give 2-(2-thiazolyl)-acetonitrile.

Using 2-(2-thiazolyl)acetonitrile in place of 2-(2-pyridyl)acetonitrile in the procedure of Example 11, the product is N-cyclopentyl-2-(2-thiazolyl)thioacetamide. Using cyclopropylamine in place of cyclopentylamine, the product is N-cyclopropyl-2-(2-thiazolyl)thioacetamide. Also, using cyclopropanemethylamine in place of cyclopentylamine, the product is N-cyclopropanemethyl-2-(2-thiazolyl)thioacetamide.

By the same procedures, using 4-(chloromethyl)-thiazole, the following products are obtained:

N-cyclopentyl-2-(4-thiazoly)thioacetamide
N-cyclopropyl-2-(4-thiazolyl)thioacetamide
N-cyclopropanemethyl-2-(4-thiazolyl)thioacetamide.

EXAMPLE 21

2-Pyrimidinecarboxylic acid (15 g.) is suspended in 200 ml. of ethanol, and gaseous hydrogen chloride is bubbled in for three hours with stirring. The mixture is concentrated in vacuo and the residue is stirred with 5% aqueous sodium hydroxide solution and extracted with dichloromethane. The extract is dried and concentrated to give ethyl 2-pyrimidinecarboxylate.

Six grams of ethyl 2-pyrimidinecarboxylate in 50 ml. of diglyme is added slowly with stirring a solution of 1 g. of sodium borohydride in 100 ml. of diglyme. Five milliliters of 2 molar aqueous aluminum chloride solution is added keeping the temperature below 50 °C. The resulting mixture is stirred for one hour at room temperature, then one hour on a steam bath. The mixture is cooled and then poured onto a mixture of ice and concentrated hydrochloric acid. Solid sodium carbonate is added to bring the pH to 10, then the mixture is extracted with chloroform, dried and concentrated to give 2-pyrimidinemethanol.

The above prepared 2-pyrimidinemethanol is treated with thionyl chloride by the procedure of Example 10 to give 2-(chloromethyl)pyrimidine.

By the procedure of Example 10, 2-(chloromethyl)-pyrimidine is reacted with sodium cyanide to give 2-(2-pyrimidyl)-acetonitrile.

Using 2-(2-pyrimidyl)acetonitrile in place of 2-(2-pyridyl)acetonitrile and using cyclopropylamine in place of cyclopentylamine in the procedure of Example 11, the product is N-cyclopropyl-2-(2-pyrimidyl)thioacetamide. Using cyclopropanemethylamine in place of cyclopentylamine, the product is N-cyclopropanemethyl-2-(2-pyrimidyl)thioacetamide.

By the same procedures, using 4-pyrimidinecarboxylic acid, the following products are obtained:

N-cyclopropyl-2-(4-pyrimidyl)thioacetamide
N-cyclopropanemethyl-2-(4-pyrimidyl)thioacetamide.

EXAMPLE 22

One gram of N-cyclopropyl-2-(2-pyridyl)thioacetamide in ether is treated with ethereal hydrogen chloride and the resulting precipitate is filtered off to give N-cyclopropyl-2-(2-pyridyl)thioacetamide hydrochloride.

Similarly, treating N-cyclpropanemethyl-2-(2-pyridyl)thioacetamide with ethereal hydrogen chloride gives N-cyclopropanemethyl-2-(2-pyridyl)thioacetamide hydrochloride.

In the same manner, using ethereal hydrogen bromide, the hydrobromide salts are prepared.

EXAMPLE 23

N-cyclopropyl-2-(2-pyridyl)thioacetamide (500 mg.) in ethanol is treated with an equimolar amount of citric acid in ethanol to give, after removing the solvent in vacuo, N-cyclopropyl-2-(2-pyridyl)thioacetamide citrate.

By the same procedure, using maleic acid, the maleate salt of N-cyclopropyl-2-(2-pyridyl)thioacetamide is preapred.

In the same manner, the citrate and maleate salts of N-cyclopropanemethyl-2-(2-pyridyl)thioacetamide are prepared.

EXAMPLE 24

| Ingredients | Amounts |
| --- | --- |
| N-cyclopropyl-2-(2-pyridyl)thioacetamide | 75 mg. |
| Lactose | 100 mg. |
| Magnesium stearate | 5 mg. |

The ingredients are mixed and filled into a hard gelatin capsule.

EXAMPLE 25

| Ingredients | Amounts |
| --- | --- |
| N-cyclopropanemethyl-2-(2-pyridyl)thioacetamide | 100 mg. |
| Calcium sulfate dihydrate | 125 mg. |
| Sucrose | 25 mg. |
| Starch | 15 mg. |
| Talc | 5 mg. |
| Stearic acid | 3 mg. |

The sucrose, calcium sulfate dihydrate and N-cyclopropanemethyl-2-(2-pyridyl)thioacetamide are thoroughly mixed and granulated with 10% gelatin solution. The wet granules are screened, dried and then mixed with the starch, talc and stearic acid, screened and compressed into a tablet.

The compositions prepared as in Examples 24 and 25 are administered orally to a subject having excessive gastric acid secretion within the dose ranges given hereabove.

What is claimed is:

1. A pharmaceutical composition having gastric acid secretion inhibitory activity, in dosage unit form, comprising a pharmaceutical carrier and a gastric acid secretion inhibiting amount of a thioamide compound of the formula:

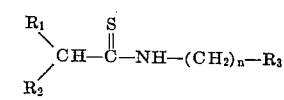

in which:
$R_1$ is a 2-pyridyl ring, said ring being optionally substituted by halogen, lower alkyl or lower alkoxy;
$R_2$ is hydrogen, lower alkyl, lower alkenyl or phenyl, said phenyl being optionally substituted by halogen, lwoer alkyl or lower alkoxy;
$R_3$ is cycloalkyl of 3 to 6 carbons and n is 0 or 1
or a pharmaceutically acceptable acid addition salt thereof.

2. The pharmaceutical composition of claim 1 in which $R_2$ is hydrogen or lower alkyl and $R_3$ is cyclopropyl.

3. The pharmaceutical composition of claim 1 in which $R_1$ is 2-pyridyl, $R_2$ is hydrogen or lower alkyl and $R_3$ is cyclopropyl.

4. The pharmaceutical composition of claim 1 in which $R_1$ is 2-pyridyl, $R_2$ is hydrogen, $R_3$ is cyclopropyl and n is 0.

5. The pharmaceutical composition of claim 1 in which $R_1$ is 2-pyridyl, $R_2$ is hydrogen, $R_3$ is cyclopropyl and n is 1.

6. The pharmaceutical composition of claim 1 in which the thioamide compound is present in an amount of from about 10 mg. to about 500 mg.

7. A method of inhibiting gastric acid secretion in an animal which comprises administering internally to an animal in need of said treatment an effective gastric acid inhibiting amount of a thioamide compound of the formula:

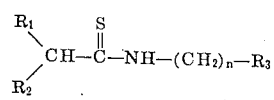

in which:
$R_1$ is a 2-pyridyl ring, said ring being optionally substituted by halogen, lower alkyl or lower alkoxy;
$R_2$ is hydrogen, lower alkyl, lower alkenyl or phenyl, said phenyl being optionally substituted by halogen, lower alkyl or lower alkoxy;
$R_3$ is cycloalkyl of 3 to 6 carbons and n is 0 or 1
or a pharmaceutically acceptable acid addition salt thereof.

8. The method of claim 7 in which $R_2$ is hydrogen or lower alkyl and $R_3$ is cyclopropyl.

9. The method of claim 7 in which $R_1$ is 2-pyridyl, $R_2$ is hydrogen or lwoer alkyl and $R_3$ is cyclopropyl.

10. The method of calim 7 in which the thioamide compound is administered in a daily dosage of from about 10 mg. to about 2 g.

* * * * *

UNITED STATES PATENT OFFICE
CERTIFICATE OF CORRECTION

Patent No. 3,821,386        Dated June 28, 1974

Inventor(s) Bernard Loev

It is certified that error appears in the above-identified patent and that said Letters Patent are hereby corrected as shown below:

Column 1, line 23,   '-pyrrolyl   should read   2-pyrrolyl .

Column 4, line 49, between "Example" and "1" omit "b" .

Column 6, line 20, 2-(1-thiazolyl) should read 2-(4-thiazolyl) .

Column 6, line 62, at the end of the line after "ethylpyridine" omit "20" .

Column 8, line 9, -2-(6-2- should read -2-(6-methyl-2- .

Signed and sealed this 22nd day of October 1974.

(SEAL)
Attest:

McCOY M. GIBSON JR.
Attesting Officer

C. MARSHALL DANN
Commissioner of Patents